United States Patent

Roesler

[11] Patent Number: 6,114,436
[45] Date of Patent: Sep. 5, 2000

[54] MOISTURE-CURABLE COMPOSITIONS CONTAINING POLYISOCYANATES AND COMPOUNDS WITH ALKOXYSILANE GROUPS

[75] Inventor: Richard R. Roesler, Wexford, Pa.

[73] Assignee: Bayer Corporation, Pittsburgh, Pa.

[21] Appl. No.: 09/294,497

[22] Filed: Apr. 20, 1999

[51] Int. Cl.[7] .............................. C08J 3/00; C08K 3/20; C08L 75/00; C08L 83/00; C08G 77/04
[52] U.S. Cl. .......................... 524/588; 524/589; 524/590; 524/730; 525/417; 525/452; 525/474; 528/28; 528/44; 528/73
[58] Field of Search ................................. 528/28, 44, 73; 524/588, 589, 590, 730; 525/417, 474, 452

[56] References Cited

U.S. PATENT DOCUMENTS

| | | | |
|---|---|---|---|
| 5,218,133 | 6/1993 | Pepe et al. | 556/420 |
| 5,700,868 | 12/1997 | Hanada | 524/590 |
| 6,005,047 | 12/1999 | Shaffer et al. | 524/590 |

*Primary Examiner*—Patrick D. Niland
*Attorney, Agent, or Firm*—Joseph C. Gil; Thomas W. Roy

[57] ABSTRACT

The present invention relates to moisture-curable compositions containing a) 5 to 95%, based on the weight of components a) and b), of polyisocyanates having (cyclo)aliphatically-bound isocyanate groups and b) 5 to 95%, based on the weight of components a) and b), of compounds containing alkoxysilane groups and corresponding to the formula

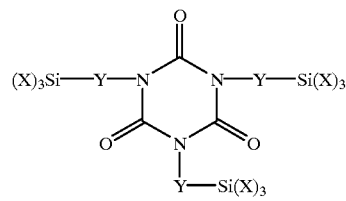

wherein
X represents identical or different organic groups which are inert to isocyanate groups below 100° C., provided that at least one of these groups is an alkoxy group and
Y represents a linear or branched alkylene radical containing 1 to 8 carbon atoms. The present invention also relates to coatings, adhesives or sealants prepared from these moisture-curable compositions.

20 Claims, No Drawings

MOISTURE-CURABLE COMPOSITIONS CONTAINING POLYISOCYANATES AND COMPOUNDS WITH ALKOXYSILANE GROUPS

BACKGROUND OF THE INVENTION

1. Field of the Invention

The present invention relates to moisture-curable compositions containing polyisocyanates having (cyclo) aliphatically-bound isocyanate groups and compounds containing alkoxysilane groups, which can be rapidly cured in the presence of moisture to form coatings, adhesives and sealants.

2. Description of the Prior Art

It is known that polyisocyanate resins are curable in the presence of atmospheric moisture to form polyurea coatings. During the curing mechanism an isocyanate group reacts with moisture to form an amino group, which then reacts with another isocyanate group to form a urea group. One of the disadvantages of these moisture-curable resins is that the curing mechanism is relatively slow.

Accordingly, it is an object of the present invention to provide moisture-curable resins having an increased curing rate.

This object may be achieved with the compositions of the present invention, which contain moisture-curable polyisocyanates in admixture with compounds containing alkoxysilane silane groups. The faster curing rates obtained from the compositions of the present invention are surprising because the compounds containing alkoxysilane groups, which are also curable in the presence of moisture, cure more slowly than polyisocyanates. However, when mixtures of these two types of compounds are present, a faster curing rate is obtained.

Copending applications, U.S. Ser. Nos. 09/172,751 and 172,584, describe polyisocyanates that have been modified to contain both isocyanate groups and alkoxysilane groups. The modified polyisocyanates cure faster than the unmodified polyisocyanates and compounds containing alkoxysilane groups. The copending applications are not directed to mixtures of polyisocyanates and compounds containing alkoxysilane groups.

SUMMARY OF THE INVENTION

The present invention relates to moisture-curable compositions containing a) 5 to 95%, based on the weight of components a) and b), of polyisocyanates having (cyclo)aliphatically-bound isocyanate groups and b) 5 to 95%, based on the weight of components a) and b), of compounds containing alkoxysilane groups and corresponding to the formula

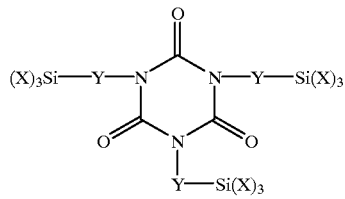

wherein
X represents identical or different organic groups which are inert to isocyanate groups below 100° C., provided that at least one of these groups is an alkoxy group and
Y represents a linear or branched alkylene radical containing 1 to 8 carbon atoms.

The present invention also relates to coatings, adhesives or sealants prepared from these moisture-curable compositions.

DETAILED DESCRIPTION OF THE INVENTION

The compositions according to the present invention are based on mixtures of polyisocyanates and compounds containing alkoxysilane groups and corresponding to formula I wherein X represents identical or different organic groups which are inert to isocyanate groups below 100° C., provided that at least one of these groups is an alkoxy group, preferably alkyl or alkoxy groups having 1 to 4 carbon atoms and more preferably alkoxy groups, Y represents a linear or branched alkylene radical containing 1 to 8 carbon atoms, preferably a linear radical containing 2 to 4 carbon atoms or a branched radical containing 5 to 6 carbon atoms, more preferably a linear radical containing 3 carbon atoms.

Preferred compounds are those in which X represents methoxy, ethoxy groups or propoxy groups, more preferably methoxy or ethoxy groups and most preferably methoxy groups. Especially preferred is tris[3-(trimethoxysilyl) propyl]isocyanurate (Silquest Y-11597, available from Witco), which corresponds to formula I when X represents methoxy groups and Y represents a linear radical containing 3 carbon atoms.

Suitable polyisocyanates a) for use in the compositions of the present invention include monomeric polyisocyanates, polyisocyanate adducts and NCO prepolymers. The polyisocyanates contain (cyclo)aliphatically-bound isocyanate groups and have an average 25 functionality of 1.5 to 6, preferably 1.8 to 6, more preferably 2 to 6 and most preferably 2 to 4.

Suitable monomeric diisocyanates may be represented by the formula $$R(NCO)_2$$

wherein R represents an organic group obtained by removing the aliphatically- and/or cycloaliphatically-bound isocyanate groups from an organic diisocyanate having a molecular weight of about 112 to 1,000, preferably about 140 to 400. Diisocyanates preferred for the process according to the invention are those in which R represents a divalent aliphatic hydrocarbon group having 4 to 40, preferably 4 to 18 carbon atoms, a divalent cycloaliphatic hydrocarbon group having 5 to 15 carbon atoms or a divalent araliphatic hydrocarbon group having 7 to 15 carbon atoms.

Examples of the suitable organic diisocyanates include 1,4-tetramethylene diisocyanate, 1,6-hexamethylene diisocyanate, 2,2,4-trimethyl-1,6-hexamethylenediisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate and mixtures thereof. Polyisocyanates containing 3 or more isocyanate groups, such as 4-isocyanantomethyl-1,8-octamethylene diisocyanate, may also be used.

Preferred organic diisocyanates include 1,6-hexamethylene diisocyanate, 1-isocyanato-3-isocyanatomethyl-3,5,5-trimethyl-cyclohexane (isophorone diisocyanate or IPDI), bis-(4-isocyanato-cyclohexyl)-methane and 1-isocyanato-1-methyl-4(3)-isocyanatomethyl cyclohexane.

In accordance with the present invention the polyisocyanate component is preferably in the form of a polyisocyanate adduct or an NCO prepolymer. Suitable polyisocyanate adducts are those containing isocyanurate, uretdione, biuret, urethane, allophanate, iminooxadiazine dione, carbodiimide and/or oxadiazinetrione groups. The polyisocyanate adducts, which preferably have an NCO content of 5 to 30% by weight, include:

1) Isocyanurate group-containing polyisocyanates which may be prepared as set forth in DE-PS 2,616,416, EP-OS 3,765, EP-OS 10,589, EP-OS 47,452, U.S. Pat. No. 4,288, 586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g, a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906, 126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to mono-allophanate groups of about 10:1 to 1:10, preferably about 5:1 to 1:7.

7) Iminooxadiazine dione and optionally isocyanurate group-containing polyisocyanates which may be prepared in the presence of special fluorine-containing catalysts as described in DE-A 19611849. These polyisocyanates generally have an average NCO functionality of 3 to 3.5 and an NCO content of 5 to 30%, preferably 10 to 25% and most preferably 15 to 25% by weight.

8) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

9) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, uretdione, biuret groups, iminooxadiazine dione and/or allophanate groups.

The NCO prepolymers, which are also preferred for use as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 500 to about 10,000, preferably 800 to about 8,000, and more preferably 1800 to 8,000, and optionally low molecular weight compounds having molecular weights below 500. The molecular weights are number average molecular weights ($M_n$) and are determined by end group analysis (OH and/or NH number). Products obtained by reacting polyisocyanates exclusively with low molecular weight compounds are polyisocyanate adducts containing urethane groups and are not considered to be NCO prepolymers.

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred, especially the polyether polyols.

Examples of suitable high molecular weight polyhydroxyl compounds include polyester polyols prepared from low molecular weight alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Polylactones having hydroxyl groups, particularly poly-ε-caprolactone, are also suitable for producing the prepolymers.

Also suitable for preparing the prepolymers are polyether polyols, which may be obtained in known manner by the alkoxylation of suitable starter molecules. Examples of suitable starter molecules include polyols, water, organic polyamines having at least two N—H bonds and mixtures thereof. Suitable alkylene oxides for the alkoxylation reaction are preferably ethylene oxide and/or propylene oxide, which may be used in sequence or in admixture.

Other suitable polyols include polycarbonates having hydroxyl groups, which may be produced by the reaction of diols with phosgene or diaryl carbonates such as diphenyl carbonate.

Further details concerning the low molecular weight compounds and the starting materials and methods for preparing the high molecular weight polyhydroxy compounds are disclosed in U.S. Pat. No. 4,701,480, herein incorporated by reference.

Other examples include the known high molecular weight amine-functional compounds, which may be prepared by converting the terminal hydroxy groups of the polyols previously described to amino groups, and the high molecular weight polyaspartates and polyaldimines disclosed in U.S. Pat. Nos. 5,243,012 and 5,466,771, respectively, herein incorporated by reference.

The NCO prepolymers preferably have an isocyanate content of 0.3 to 35% by weight, more preferably 0.6 to 25% by weight and most preferably 1.2 to 20% by weight. The NCO prepolymers are produced by reacting the diisocyanates with the polyol component at a temperature of 40 to 120° C., preferably 50 to 100° C., at an NCO/OH equivalent ratio of 1.3:1 to 20:1, preferably 1.4:1 to 10:1. If chain extension via urethane groups is desired during the preparation of the isocyanate prepolymers, an NCO/OH equivalent ratio of 1.3:1 to 2:1 is selected. If chain extension is not desired, an excess of diisocyanate is preferably used, corresponding to an NCO/OH equivalent ratio of 4:1 to 20:1, preferably 5:1 to 10:1. The excess diisocyanate may optionally be removed by thin layer distillation when the reaction is completed. In accordance with the present invention NCO prepolymers also include NCO semi-prepolymers which contain unreacted starting polyisocyanates in addition to the urethane group-containing prepolymers.

The moisture-curable compounds according to the invention are prepared by blending polyisocyanate a) with compounds b) containing alkoxysilane groups. Component a) is present in an amount of 5 to 95% by weight, preferably 10 to 90% by weight, more preferably 15 to 85% by weight and most preferably 20 to 80% by weight, based on the weight of components a) and b). The ranges for component b) are the same as those for component a).

The compositions of the present invention may be cured in the presence of water or moisture to prepare coatings, adhesives or sealants. The compositions cure by a dual cure mechanism, i.e., 1) by the reaction of isocyanate groups with moisture and
2) by "silane polycondensation" from the hydrolysis of alkoxysilane groups to form Si—OH groups and their subsequent reaction with either Si—OH or Si—OR groups to form siloxane groups (Si—O—Si) and
3) conceivably by the reaction of isocyanate groups with Si-OH groups.

Suitable acidic or basis catalysts may be used to promote the curing reaction. Examples include acids such as paratoluene sulfonic acid; metallic salts such as dibutyl tin dilaurate; tertiary amines such as triethylamine or triethylene diamine; and mixtures of these catalysts. Low molecular weight, basic aminoalkyl trialkoxysilanes, such as those represented by formula II, also accelerate hardening of the compounds according to the invention.

The one-component compositions generally may be either solvent-free or contain up to 70%, preferably up to 60% organic solvents, based on the weight of the one-component composition, depending upon the particular application. Suitable organic solvents include those which are known from polyurethane chemistry.

The compositions may also contain known additives, such as leveling agents, wetting agents, flow control agents, antiskinning agents, antifoaming agents, fillers (such as silica, aluminum silicates and high-boiling waxes), viscosity regulators, plasticizers, pigments, dyes, UV absorbers and stabilizers against thermal and oxidative degradation.

The one-component compositions may be applied to any desired substrates, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented lacquers.

The one-component compositions may be cured at ambient temperature or at elevated temperatures. Preferably, the moisture-curable compositions are cured at ambient temperatures.

The invention is further illustrated but is not intended to be limited by the following examples in which all parts and percentages are by weight unless otherwise specified.

EXAMPLES

Polyisocyanate 1 (Comparison)

An isocyanurate group-containing polyisocyanate prepared from 1,6-hexamethylene diisocyanate and having an isocyanate content of 21.6%, a content of monomeric diisocyanate of <0.2% and a viscosity at 20° C. of 3000 mPa.s (available from Bayer Corporation as Desmodur N 3300).

Alkoxysilane 1

Tris[3-(trimethoxysilyl)propyl]isocyanurate (Silquest Y-11597, available from Witco).

Preparation of Films from Polyisocyanate 1 and Alkoxysilane 1

Coating compositions were prepared by mixing the polyisocyanate 1, alkoxysilane 1 and a catalyst mixture in the amounts set forth in the following table. The compositions were applied to glass plates with a 5 mil draw down bar and cured at 22° C. and 65% relative humidity. Dry times were determined with a Gardner Dry Time Meter as described in the Pacific Scientific Instruction Manuals DG-9600 and DG-9300. Pendulum hardness was determined in accordance with ASTM D-4366-87 (Koenig Pendulum Hardness).

TABLE 1

| Formulation, parts | A | B | C | D | E |
| --- | --- | --- | --- | --- | --- |
| Polyisocyanate 1 | 10 | 7.5 | 5 | 2.5 | 0 |
| Alkoxysilane 1 | 0 | 2.5 | 5 | 7.5 | 10 |
| Diazobicyclooctane | 0.1 | 0.1 | 0.1 | 0.1 | 0.1 |
| Dibutylin acetoacetonate | 0.1 | 0.1 | 0.1 | 0.1 | 0.1 |
| Dry Times, min | | | | | |
| Set to Touch | 85 | 25 | 15 | 30 | 150 |
| Dust Dry | 175 | 45 | 40 | 45 | 165 |
| Hard Dry | >360 | 180 | 85 | 195 | 210 |
| Pendulum Hardness, sec | | | | | |
| 1 day | 25 | 137 | 106 | 88 | 66 |
| 10 days | 250 | 212 | 205 | 200 | 180 |
| 21 days | 241 | 212 | 205 | 200 | 189 |

It is apparent from the results set forth in the preceding table that the compositions according to the invention had better curing rates than either of the pure compounds used to prepare these compositions.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A moisture-curable composition comprising a) 5 to 95%, based on the weight of components a) and b), of a polyisocyanate having (cyclo)aliphatically-bound isocyanate groups and b) 5 to 95%, based on the weight of components a) and b), of a compound containing alkoxysilane groups and corresponding to the formula

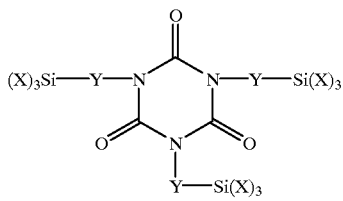

wherein
- X represents identical or different organic groups which are inert to isocyanate groups below 100° C., provided that at least one of these groups is an alkoxy group and
- Y represents a linear or branched alkylene radical containing 1 to 8 carbon atoms.

2. The moisture-curable composition of claim 1 wherein
- X represents identical or different alkyl or alkoxy groups having 1 to 4 carbon atoms and
- Y represents a linear radical containing 2 to 4 carbon atoms or a branched radical containing 5 to 6 carbon atoms.

3. The moisture-curable composition of claim 2 wherein
- X represents a methoxy group and
- Y represents a linear radical containing 3 carbon atoms.

4. The moisture-curable composition of claim 1 wherein component a) is present in an amount of 10 to 90% by weight and component b) is present in an amount of 10 to 90% by weight, wherein the percentages are based on the weight of components a) and b).

5. The moisture-curable composition of claim 1 wherein component a) is present in an amount of 15 to 85% by weight and component b) is present in an amount of 15 to 85% by weight, wherein the percentages are based on the weight of components a) and b).

6. The moisture-curable composition of claim 2 wherein component a) is present in an amount of 15 to 85% by weight and component b) is present in an amount of 15 to 85% by weight, wherein the percentages are based on the weight of components a) and b).

7. The moisture-curable composition of claim 3 wherein component a) is present in an amount of 15 to 85% by weight and component b) is present in an amount of 15 to 85% by weight, wherein the percentages are based on the weight of components a) and b).

8. The moisture-curable composition of claim 1 wherein polyisocyanate a) comprises a polyisocyanate adduct containing isocyanurate, uretdione, biuret, iminooxadiazine dione and/or allophanate groups.

9. The moisture-curable composition of claim 2 wherein polyisocyanate a) comprises a polyisocyanate adduct containing isocyanurate, uretdione, biuret, iminooxadiazine dione and/or allophanate groups.

10. The moisture-curable composition of claim 3 wherein polyisocyanate a) comprises a polyisocyanate adduct containing isocyanurate, uretdione, biuret, iminooxadiazine dione and/or allophanate groups.

11. The moisture-curable composition of claim 4 wherein polyisocyanate a) comprises a polyisocyanate adduct containing isocyanurate, uretdione, biuret, iminooxadiazine dione and/or allophanate groups.

12. The moisture-curable composition of claim 5 wherein polyisocyanate a) comprises a polyisocyanate adduct containing isocyanurate, uretdione, biuret, iminooxadiazine dione and/or allophanate groups.

13. The moisture-curable composition of claim 7 wherein polyisocyanate a) comprises a polyisocyanate adduct containing isocyanurate, uretdione, biuret, iminooxadiazine dione and/or allophanate groups.

14. The moisture-curable composition of claim 1 wherein polyisocyanate a) comprises an NCO prepolymer.

15. The moisture-curable composition of claim 2 wherein polyisocyanate a) comprises an NCO prepolymer.

16. The moisture-curable composition of claim 3 wherein polyisocyanate a) comprises an NCO prepolymer.

17. The moisture-curable composition of claim 4 wherein polyisocyanate a) comprises an NCO prepolymer.

18. The moisture-curable composition of claim 5 wherein polyisocyanate a) comprises an NCO prepolymer.

19. The moisture-curable composition of claim 7 wherein polyisocyanate a) comprises an NCO prepolymer.

20. A coating, adhesive or sealant prepared from the moisture-curable composition of claim 1.

* * * * *